United States Patent
Binkai et al.

(10) Patent No.: US 11,212,145 B2
(45) Date of Patent: Dec. 28, 2021

(54) SIGNAL SHAPING DEVICE, SHAPING TERMINATION DEVICE, SIGNAL SHAPING METHOD, AND OPTICAL TRANSMISSION METHOD

(71) Applicant: Mitsubishi Electric Corporation, Tokyo (JP)

(72) Inventors: Masashi Binkai, Tokyo (JP); Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 280 days.

(21) Appl. No.: 16/479,139

(22) PCT Filed: Mar. 16, 2017

(86) PCT No.: PCT/JP2017/010703
§ 371 (c)(1),
(2) Date: Jul. 18, 2019

(87) PCT Pub. No.: WO2018/167920
PCT Pub. Date: Sep. 20, 2018

(65) Prior Publication Data
US 2021/0281450 A1    Sep. 9, 2021

(51) Int. Cl.
*H04L 25/49* (2006.01)
*H04L 27/04* (2006.01)
(Continued)

(52) U.S. Cl.
CPC ....... *H04L 25/4917* (2013.01); *H04B 10/524* (2013.01); *H04B 10/541* (2013.01); *H04L 27/04* (2013.01); *H04L 27/365* (2013.01)

(58) Field of Classification Search
CPC ... H04L 27/362; H04L 25/4917; H04L 27/36; H04L 25/4927; H04L 27/04; H04L 27/365
(Continued)

(56) References Cited

U.S. PATENT DOCUMENTS 8,503,564 B2    8/2013  Li et al.
9,929,813 B1 *  3/2018  Batshon .............. H04B 10/516
(Continued)

FOREIGN PATENT DOCUMENTS

CN    102439868 B    9/2014

OTHER PUBLICATIONS

Extended European Search Report issued in corresponding European Application No. 17901313.1 dated Feb. 7, 2020.
(Continued)

*Primary Examiner* — Emmanuel Bayard
(74) *Attorney, Agent, or Firm* — Birch, Stewart, Kolasch & Birch, LLP

(57) ABSTRACT

A signal shaping device includes: a generation unit to perform plural types of predetermined processes on blocks obtained by dividing plural sequences of bit strings by a predetermined length, and generate a plurality of candidate blocks that are candidates for a shaped block to be transmitted; a calculation unit to calculate, on a candidate-block-by-candidate-block basis, a weight of a one-dimensional modulation symbol when a plurality of bits included in the candidate block are converted into the one-dimensional modulation symbol; a selection unit to select, from among the candidate blocks, the shaped block on a basis of the weight; an addition unit to add, to the shaped block, selection information indicating a selection result; and a symbol mapping unit to generate a one-dimensional modulation
(Continued)

signal by converting a plurality of bits included in the shaped block, into the one-dimensional modulation symbol.

20 Claims, 13 Drawing Sheets

(51) Int. Cl.
*H04B 10/54* (2013.01)
*H04B 10/524* (2013.01)
*H04L 27/36* (2006.01)

(58) Field of Classification Search
USPC .................................. 375/242, 265, 295, 298
See application file for complete search history.

(56) References Cited

U.S. PATENT DOCUMENTS

| | | | |
|---|---|---|---|
| 2014/0376665 A1* | 12/2014 | Bai | H04L 1/0057 375/300 |
| 2018/0026725 A1* | 1/2018 | Cho | H04L 1/0042 714/776 |
| 2018/0083716 A1* | 3/2018 | Cho | H04L 27/3411 |

OTHER PUBLICATIONS

European Office Action dated Sep. 7, 2020 for Application No. 17 901 313.1.
Chinese Office Action and Search Report for Chinese Application No. 201780088293.5. dated Jul. 12, 2021, with English translation.
Agrell et al., Power-Efficient Modulation Formats in Coherent Transmission Systems, Journal of Lightwave Technology, vol. 27, No. 22, Nov. 15, 2009, pp. 5115-5126.
Buchali et al., "Rate Adaptation and Reach Increase by Probabilistically Shaped 64-QAM: An Experimental Demonstration", Journal of Lightwave Technology, vol. 34, No. 7, Apr. 1, 2016, pp. 1599-1609.
Böcherer et al., "Bandwidth Efficient and Rate-Matched Low-Density Parity-Check Coded Modulation", IEEE Transactions on Communications, vol. 63, No. 12, Dec. 2015, pp. 4651-4665.
Chang et al., "Forward Error Correction for 100 G Transport Networks", IEEE Communications Magazine, 100 Gigabit Ethernet Transport, vol. 48, No. 3, Mar. 2010, pp. S48-S55.
Cho et al., "Low-Complexity Shaping for Enhanced Nonlinearity Tolerance", 42nd European Conference and Exhibition on Optical Communications (ECOC 2016), Sep. 18-22, 2016, pp. 467-469.
Dar et al., "On Shaping Gain in the Nonlinear Fiber-Optic Channel", 2014 IEEE International Symposium on Information Theory, Jul. 2014, pp. 2794-2798.
Forney Jr. et al., "Multidimensional Constellations—Part I: Introduction, Figures of Merit, and Generalized Cross Constellations", IEEE Journal on Selected Areas in Communications, vol. 7, No. 6, Aug. 1989, pp. 877-892.
Kojima et al., "Constant Modulus 4D Optimized Constellation Alternative for DP-8QAM", ECOC 2014, p. 3 25, Sep. 2014, pp. 1-3.
Kojima et al., "Nonlinearity-tolerant four-dimensional 2A8PSK family for 5-7 bits/symbol spectral efficiency", Journal of Lightwave Technology, ECOC2016, vol. 35, No. 8, Sep. 2016, pp. 1-9.
Kschischang et al., "Optimal Nonuniform Signaling for Gaussian Channels", IEEE Transaction on Information Theory, vol. 39, No. 3, May 1993, pp. 913-929.
Raphaeli et al., "Transactions Letters: Constellation Shaping for Pragmatic Turbo-Coded Modulation with High Spectral Efficiency", IEEE Transaction on Communications, vol. 52, No. 3, Mar. 2004, pp. 341-345.
Schulte et al., "Constant Composition Distribution Matching", IEEE Transactions on Information Theory, vol. 62, No. 1, Jan. 2016, pp. 430-434.
Shiner et al., "Demonstration of an 8D Modulation Format with Reduced Inter-Channel Nonlinearities in a Polarization Multiplexed Coherent System", Optics Express, vol. 22, No. 17, Aug. 2014, pp. 20 366-20 374 (Total No. pp. 7).
Yankov et al., "Rate-adaptive Constellation Shaping for Near-capacity Achieving Turbo Coded BICM", IEEE ICC 2014—Communications Theory, Jul. 2014, pp. 2112-2117.
Yankovn et al., "Constellation Shaping for WDM Systems Using 256QAM/1024QAM with Probabilistic Optimization", Journal of Lightwave Technology, vol. 34, No. 22, Nov. 15, 2016, pp. 5146-5156.

* cited by examiner

| INPUT BIT ($B_1, B_2, B_3$) | OUTPUT LEVEL AMP |
|---|---|
| 010 | +7 |
| 011 | +5 |
| 001 | +3 |
| 000 | +1 |
| 100 | -1 |
| 101 | -3 |
| 111 | -5 |
| 110 | -7 |

FIG.6

```
       START  ─ S102
         │
         ▼         ─ S110
  GENERATE CANDIDATE
       BLOCKS
         │
         ▼         ─ S111
   CALCULATE WEIGHT
         │
         ▼         ─ S112
  SELECT SHAPED BLOCK
         │
         ▼         ─ S113
   ADD SELECTION
    INFORMATION
         │
         ▼
        END
```

FIG.7

| INPUT BIT $(B_1, B_2, B_3)$ type1 | OUTPUT LEVEL AMP_type1 | INPUT BIT $(B_1, B_2, B_3)$ type2 | OUTPUT LEVEL AMP_type2 |
|---|---|---|---|
| 010 | +7 | 000 | +1 |
| 011 | +5 | 001 | +3 |
| 001 | +3 | 011 | +5 |
| 000 | +1 | 010 | +7 |
| 100 | -1 | 110 | -7 |
| 101 | -3 | 111 | -5 |
| 111 | -5 | 101 | -3 |
| 110 | -7 | 100 | -1 |

SIGNAL SHAPING DEVICE, SHAPING TERMINATION DEVICE, SIGNAL SHAPING METHOD, AND OPTICAL TRANSMISSION METHOD

FIELD

The present invention relates to a signal shaping device, a shaping termination device, a signal shaping method, and an optical transmission method that are capable of increasing data transmission speed.

BACKGROUND

In communication systems, a technique has been proposed to shape a signal and transmit the shaped signal in order to improve noise tolerance during transmission. Normally, signal shaping is performed on the transmission-path side following error correction. That is, the transmitter side performs the signal shaping after the error correction coding, while the receiver side performs shaping termination before error correction decoding. Such a concatenation method between the error correction and the signal shaping is referred to as "Normal Concatenation". For a method disclosed in non-Patent Literature 1, the transmitter side performs signal shaping before error correction coding, while the receiver side performs shaping termination after error correction decoding. Such a concatenation method between the error correction and the signal shaping is referred to as "Reverse Concatenation" in contrast to Normal Concatenation. Signal processing needs to be performed on a shaped signal in such a manner as not to break up a pair of bits representing the amplitude, and an error correction parity needs to be assigned to a bit that does not affect the amplitude in order not to affect the bits representing the amplitude. Unfortunately, there is a possibility that such a constraint is not allowed from the standpoint of the circuit implementation. The shaping method described in non-Patent Literature 1 is referred to as CCDM (Constant Composition Distribution Matching). Non Patent Literature 2 describes this shaping method in detail. The CCDM, which is a shaping method applicable to generation of a PAM (Pulse Amplitude Modulation) signal, uses arithmetic codes having a block length of approximately 10000 bits to shape the probability of occurrence of a certain signal point. Non-Patent Literature 3 describes application of the CCDM to optimal transmission.

However, the shaping method referred to as CCDM needs a block length of approximately 10000 bits, and thus has a problem with the circuit implementation. In contrast to this CCDM method, Non Patent Literature 4 describes the Cut And Paste (CAP) method as a shaping method capable of reducing the block length compared to the CCDM. For the method described in Non Patent Literature 4, two types of bit allocation tables are prepared in a LUT (Look up Table) format, and the bit allocation table that requires a lower average power is selected to perform signal shaping and transmit the shaped signal along with a result of the selection. The receiver side performs decoding, using a LUT of a bit allocation table selected on the basis of the result of the selection.

CITATION LIST

Non Patent Literatures

Non-Patent Literature 1: G. Bocherer, and two others, "Bandwidth Efficient and Rate-Matched Low-Density Parity-Check Coded Modulation", IEEE Transactions on Communications, vol. 63, no. 12, pp. 4651-4665, December 2015.

Non-Patent Literature 2: P. Schulte, and one other, "Constant Composition Distribution Matching", IEEE Transactions on Information Theory, vol. 62, no. 1, pp. 430-434, January 2016.

Non-Patent Literature 3: F. Buchali, and five others, "Rate Adaptation and Reach Increase by Probabilistically Shaped 64-QAM:An Experimental Demonstration", Journal of Lightwave Technology, vol. 34, no. 7, pp. 1599-1609, April 2016.

Non-Patent Literature 4: J. Cho, and three others, "Low-Complexity Shaping for Enhanced Nonlinearity Tolerance", ECOC2016, W.1.C.2, pp. 467-469, September 2016.

SUMMARY

Technical Problem

For the technique described in non-Patent Literature 4 mentioned above, the shaping process is performed on a two-dimensional modulation QAM (Quadrature Amplitude Modulation) signal. For this reason, complex circuit implementation is still needed, which requires more complex processing. For example, signal shaping needs a LUT having an address space of the square of 6 to the twelfth power of 6.

The present invention has been achieved to solve the above problems, and an object of the present invention is to provide a signal shaping device, a shaping termination device, a signal shaping method, and an optical transmission method that are capable of shaping a signal with a simpler configuration and improving noise tolerance during transmission.

Solution to Problem

To solve the above problem and achieve the object, the present invention provides a signal shaping device comprising: a generation unit to perform plural types of predetermined processes on blocks obtained by dividing plural sequences of bit strings by a predetermined length, and generate a plurality of candidate blocks that are candidates for a shaped block to be transmitted; a calculation unit to calculate, on a candidate-block-by-candidate-block basis, a weight of a one-dimensional modulation symbol when a plurality of bits included in the candidate block are converted into the one-dimensional modulation symbol; a selection unit to select the shaped block from among the candidate blocks on a basis of the weight; an addition unit to add, to the shaped block, selection information indicating a selection result; and a symbol mapping unit to generate a one-dimensional modulation signal by converting a plurality of bits included in the shaped block, into the one-dimensional modulation symbol.

Advantageous Effects of Invention

The signal shaping device according to the present invention has an effect of shaping the signal with the simpler configuration and improving the noise tolerance during transmission.

BRIEF DESCRIPTION OF DRAWINGS

FIG. 6 is a flowchart illustrating details of an operation at Step S102 in FIG. 5.

FIG. 7 is a diagram illustrating a correspondence between an output level relative to an input bit of type1, an input bit of type2 having $B_2$ of the input bit subjected to a logic inversion process, and an output level relative to the input bit of type2, the correspondence being based on the correspondence illustrated in FIG. 3.

DESCRIPTION OF EMBODIMENTS

A signal shaping device, a shaping termination device, a signal shaping method, and an optical transmission method according to embodiments of the present invention will be described below in detail with reference to the accompanying drawings. The present invention is not limited to the embodiments.

First Embodiment

Figure 1:
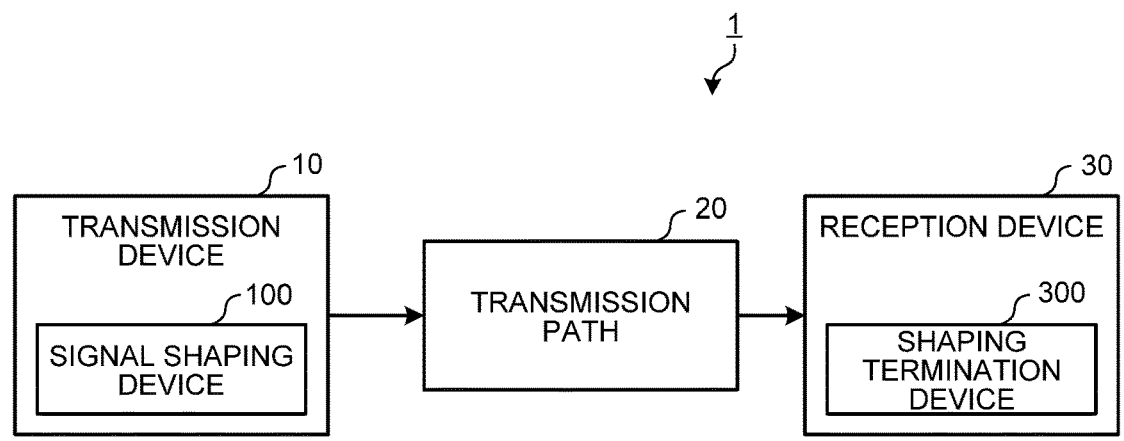
FIG. 1 is a diagram illustrating a configuration of a shaped-signal transmission system according to a first embodiment of the present invention.

FIG. 1 is a diagram illustrating a configuration of a shaped-signal transmission system 1 according to a first embodiment of the present invention. The shaped-signal transmission system 1 includes a transmission device 10, a transmission path 20, and a reception device 30. The transmission device 10 includes a signal shaping device 100. The reception device 30 includes a shaping termination device 300. A signal shaped by the signal shaping device 100 of the transmission device 10 is transmitted through the transmission path 20 to the reception device 30, and then restored by the shaping termination device 300 to the pre-shaping state.

There are two types of signal shaping methods. The first method is referred to as "normal concatenation" in which a signal shaping process is performed on a signal after error correction coding, and then the signal is restored to the pre-shaping state before error correction decoding. The second method is referred to as "reverse concatenation" in which a signal shaping process is performed on a signal before error correction coding, and then restored to the pre-shaping state after error correction decoding. The signal shaping method to be explained in the present embodiment is applicable to both the normal concatenation and the reverse concatenation. In the first embodiment, configurations and operations of both the signal shaping device 100 and the shaping termination device 300 for performing the normal concatenation process are described below.

Figure 2:
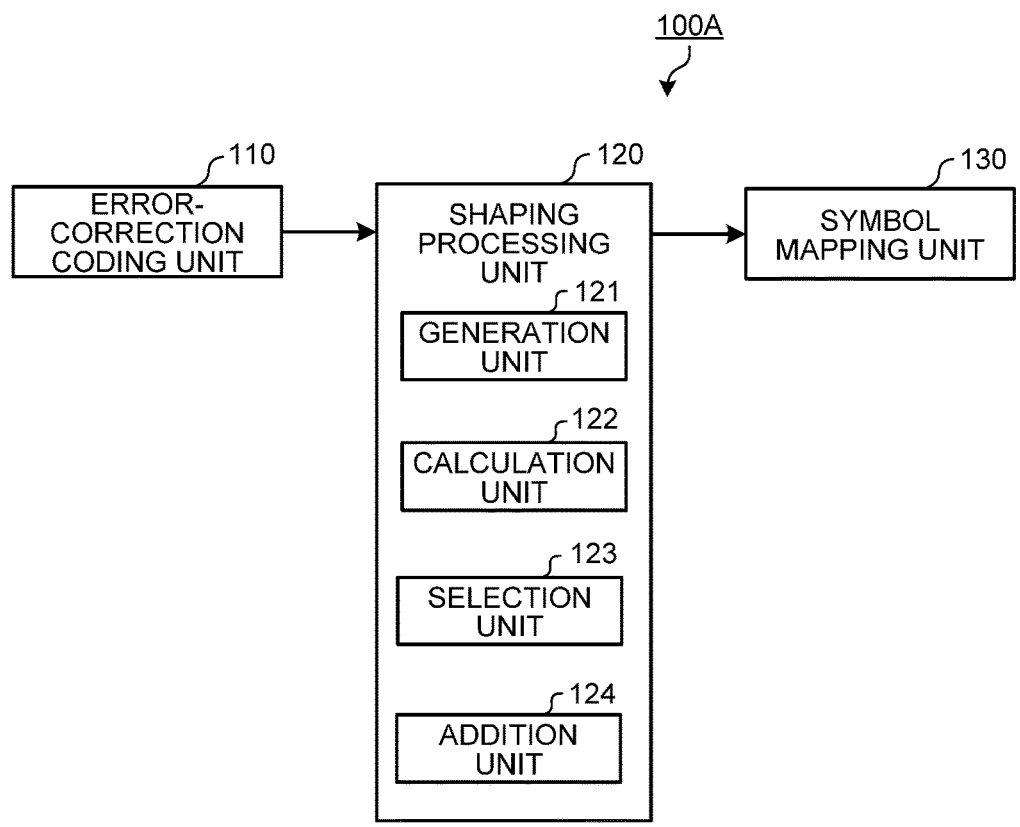
FIG. 2 is a diagram illustrating a configuration of a signal shaping device illustrated in FIG. 1 to perform a normal concatenation process.

FIG. 2 is a diagram illustrating a configuration of the signal shaping device 100 illustrated in FIG. 1 to perform the normal concatenation process. A signal shaping device 100A illustrated in FIG. 2 includes an error-correction coding unit 110, a shaping processing unit 120, and a symbol mapping unit 130. The error-correction coding unit 110 performs error correction coding on an input signal and outputs the error-correction coded signal.

The shaping processing unit 120 performs a shaping process on an input signal and outputs the shaped signal. The shaping processing unit 120 includes a generation unit 121, a calculation unit 122, a selection unit 123, and an addition unit 124. The generation unit 121 performs plural types of predetermined processes on a block-by-block basis. The block is obtained by dividing plural sequences of bit strings by a predetermined length. The generation unit 121 performs the plural types of predetermined processes on each of blocks and generates a plurality of candidate blocks. The candidate blocks are candidates for a shaped block to be output. For example, the predetermined length ranges from several bits to several hundreds of bits approximately. The calculation unit 122 calculates a weight of a symbol in each of the candidate blocks generated by the generation unit 121. The weight calculated by the calculation unit 122 indicates the magnitude of power required to transmit each block. This weight is any one of: the power of a symbol included in each block; the square root of the power; the square of the power; and the number of occurrences of logic 1 in a predetermined sequence of bit string among the plural sequences. Alternatively, the weight calculated by the calculation unit 122 may be a distance from any reference value to any one of: the power of a symbol included in each block; the square root of the power; the square of the power; and the number of occurrences of logic 1 in a predetermined sequence of bit string among the plural sequences. The selection unit 123 selects a shaped block from among the candidate blocks on the basis of the weight in each candidate block calculated by the calculation unit 122. The addition unit 124 adds, to the shaped block, selection information indicating a result of the selection. Operations of the shaping processing unit 120 are described below in detail.

On the basis of an input bit string, the symbol mapping unit 130 generates a symbol X of a one-dimensional modulation signal that is a multilevel signal having a multilevel value, and outputs a symbol sequence. A one-dimensional modulation method is intended to modulate signals in such a manner that their respective signal points are aligned in the complex signal representation. Examples of the one-dimensional modulation method include pulse amplitude modulation, BPSK (Binary Phase Shift Keying), ASK (Amplitude Shift Keying), and OOK (On-Off Keying). The symbol mapping unit 130 converts an input bit string to a symbol in the one-dimensional modulation method on the basis of a predetermined correspondence relation.

Figures 3, 4:
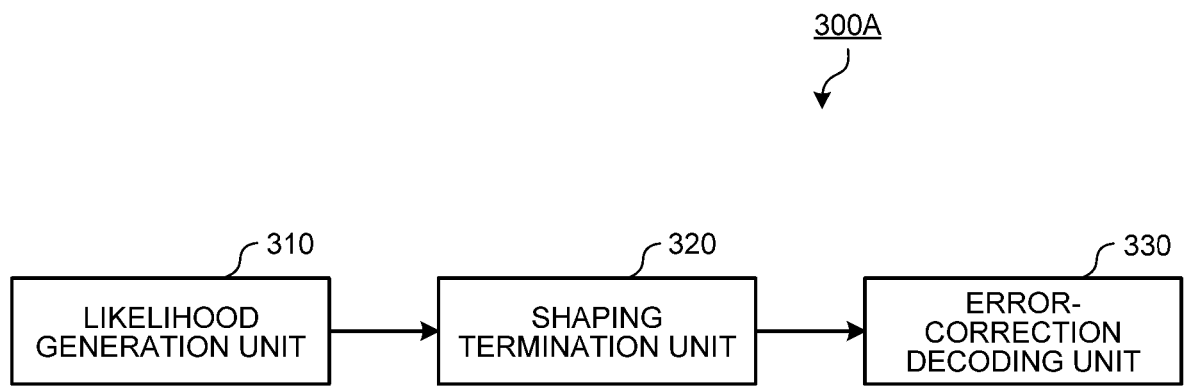
FIG. 3 is a diagram illustrating a correspondence when a symbol mapping unit illustrated in FIG. 2 converts three sequences of bit strings into PAM8 symbols.
FIG. 4 is a diagram illustrating a configuration of a shaping termination device illustrated in FIG. 1 to perform a normal concatenation process.

FIG. 3 is a diagram illustrating a correspondence when the symbol mapping unit 130 illustrated in FIG. 2 converts three sequences of bit strings into PAM8 symbols. PAM8 is a modulation method for converting three sequences of input bits to symbols with any one of eight output levels. The symbol mapping unit 130 converts three sequences of input bits $B=(B_1, B_2, B_3)$ included in three input sequences of bit strings $A=(A_1, A_2, A_3)$ into symbols with any one of the eight predetermined output levels. In an example in FIG. 3, an input bit B=010 is converted into a pulse signal with an output level of "+7". Similarly, an input bit B=011 is converted into a pulse signal with an output level of "+5". An input bit B=001 is converted into a pulse signal with an output level of "+3". An input bit B=000 is converted into a pulse signal with an output level of "+1". An input bit B=100 is converted into a pulse signal with an output level of "−1". An input bit B=101 is converted into a pulse signal with an output level of "−3". An input bit B=111 is converted into a pulse signal with an output level of "−5". An input bit B=110 is converted into a pulse signal with an output level of "−7".

In the signal shaping device 100A, an output signal from the error-correction coding unit 110 is input to the shaping processing unit 120, and an output signal from the shaping processing unit 120 is input to the symbol mapping unit 130. That is, the error-correction coding unit 110 performs error correction coding on a signal before the signal undergoes a shaping process, and the shaping processing unit 120 performs a shaping process on the error-correction coded signal. The shaping processing unit 120 performs a shaping process on plural sequences of bit strings that make up a one-dimensional modulation signal. This is advantageous in that the shaping process on the one-dimensional modulation signal requires a simpler configuration and can be performed more efficiently than a shaping process on a two-dimensional modulation signal.

FIG. 4 is a diagram illustrating a configuration of the shaping termination device 300 illustrated in FIG. 1 to perform the normal concatenation process. A shaping termination device 300A illustrated in FIG. 4 includes a likelihood generation unit 310, a shaping termination unit 320, and an error-correction decoding unit 330. The likelihood generation unit 310 determines a log-likelihood ratio L for a received symbol Y. On the basis of the determined log-likelihood ratio L, the shaping termination unit 320 performs a shaping termination process on a received shaped block to restore this block to the pre-shaping state. The shaping termination process is described below in detail.

The error-correction decoding unit 330 performs forward error correction decoding on an input signal.

In the shaping termination device 300A, an output signal from the likelihood generation unit 310 is input to the shaping termination unit 320, and an output signal from the shaping termination unit 320 is input to the error-correction decoding unit 330. That is, the shaping termination unit 320 performs a shaping termination process on a post-likelihood-generation signal, and the error-correction decoding unit 330 performs forward error correction decoding on the signal having been restored to the pre-shaping state.

Figure 5:
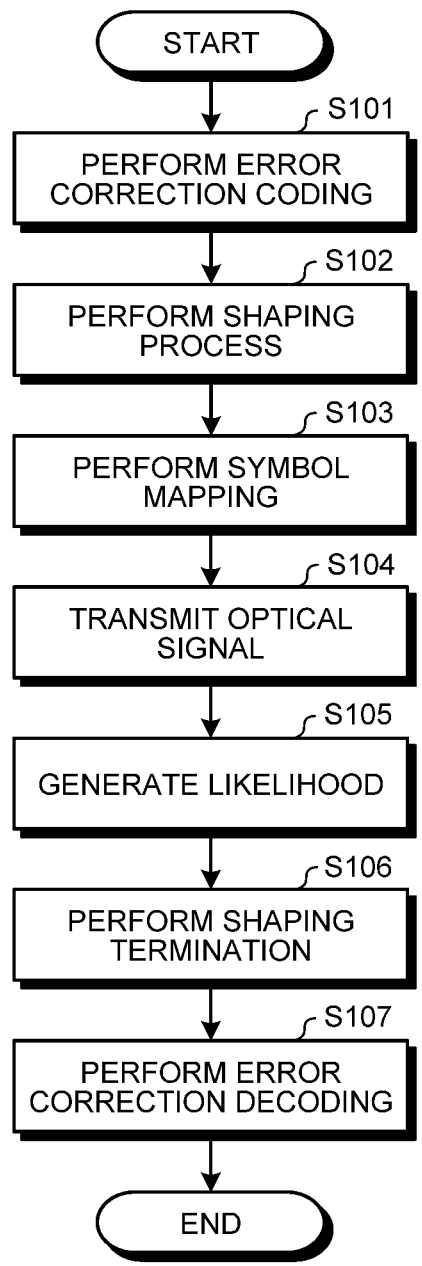
FIG. 5 is a flowchart illustrating an operation of the shaped-signal transmission system illustrated in FIG. 1.

FIG. 5 is a flowchart illustrating an operation of the shaped-signal transmission system 1 illustrated in FIG. 1. The error-correction coding unit 110 of the signal shaping device 100A performs error correction coding on an input signal and inputs, to the shaping processing unit 120, the signal having undergone the error correction coding (Step S101). The shaping processing unit 120 performs a shaping process on the signal having undergone the error correction coding, thereby generating a shaped block. Then, the shaping processing unit 120 inputs, to the symbol mapping unit 130, the shaped block generated (Step S102).

FIG. 6 is a flowchart illustrating details of the operation at Step S102 in FIG. 5. The generation unit 121 of the shaping processing unit 120 performs a predetermined process on blocks obtained by dividing plural sequences of bit strings that make up a one-dimensional modulation signal by a predetermined length, such that the generation unit 121 generates a plurality of candidate blocks that are candidates for a shaped block to be transmitted (Step S110). Specifically, the generation unit 121 generates a block having at least one sequence of bit string undergone the predetermined process that is a complete inversion process. Then, the generation unit 121 provides the generated block and a block not undergoing the complete inversion process. The generated block and the block not undergoing the complete inversion process are defined as candidate blocks. For example, assume that bits included in an input bit string $A[t]=(A_1[t], A_2[t], A_3[t])$ are divided by four into blocks. The generation unit 121 generates two types of candidate blocks: a candidate block having the second sequence of an input bit string $A_2[t]$ subjected to a complete inversion process; and a candidate block having not undergone the complete inversion process. For example, input bit strings A[1]=(0, 1, 0), A[2]=(0, 1, 1), A[3]=(0, 0, 1), and A[4]=(0, 0, 1) undergo the complete inversion process into A[1]=(0, 0, 0), A[2]=(0, 0, 1), A[3]=(0, 1, 1), and A[4]=(0, 1, 1), respectively.

The calculation unit 122 calculates a weight W of a symbol included in each of plural candidate blocks generated (Step S111). The calculation unit 122 calculates a weight of the symbol defined as the square of a power of the symbol. Where the weight of the symbol is defined as the square of a power of the symbol, the weight W of the symbol per block is calculated as the sum of the squares of a power of the symbols. An input bit string A that does not undergo any process is defined as "type1", and thus the weight of type1 is represented as W1. The input bit string A having an input bit string $A_2[t]$ subjected to a complete inversion process is defined as "type2", and thus the weight of type2 is represented as W2. In such cases, W1 is expressed as the following equation (1), while W2 is expressed as the following equation (2). "AMP_type1" represents an output level when a symbol mapping process is performed on a type1 input bit. "AMP_type2" represents an output level when a symbol mapping process is performed on a type2 input bit.

$$W1 = \Sigma |\text{AMP\_type1}[t]|^2 \quad (1)$$

$$W2 = \Sigma |\text{AMP\_type2}[t]|^2 \quad (2)$$

FIG. 7 is a diagram illustrating a correspondence between the output level AMP_type1 relative to an input bit of type1, an input bit of type2 having $B_2$ of the input bit subjected to a logic inversion process, and the output level AMP_type2 relative to the input bit of type2, the correspondence being based on the correspondence illustrated in FIG. 3. When the symbol mapping process uses the correspondence illustrated in FIG. 7, the following equation (3) holds true. Thus, a difference $\Delta W$ between W1 and W2 is expressed as the following equation (4).

$$\text{AMP\_type2}[t] = 8 - \text{AMP\_type1}[t] \quad (3)$$

$$\Delta W = W1 - W2 = 16\Sigma(|\text{AMP\_type1}[t]| - 4) \quad (4)$$

Reference is made back to FIG. 6. The selection unit 123 selects a shaped block on the basis of the weight W calculated block-by-block by the calculation unit 122 (Step S112). Specifically, a candidate block having a smaller value of the weight is selected as a shaped block by the selection unit 123. Where $\Delta W < 0$, the selection unit 123 selects a candidate block of type1 as a shaped block. Where $\Delta W > 0$, the selection unit 123 selects a candidate block of type2 as a shaped block. Where $\Delta W = 0$, the selection unit 123 may select a candidate block of either type1 or type2 as a shaped block, although it is desirable to select both at a similar ratio. Accordingly, on the basis of the disproportionate selection results, the selection unit 123 selects a shaped block from among the candidate blocks so as to reduce the disproportionate ratio between the selection results. For example, the selection unit 123 can have the history of ten previous selection results stored therein so as to select a candidate block of either type1 or type2 whichever has been selected with lower frequency as a shaped block. Alternatively, the selection unit 123 may select a candidate block of type1 when the block number indicates an odd number, and select a candidate block of type2 when the block number indicates an even number. Although example described above gives two types of candidate blocks, three or more types of candidate blocks may be generated in which case the selection unit 123 can select a candidate block with a minimum weight as a shaped block from among a plurality of candidate blocks.

When a shaped block is selected, the addition unit 124 adds, to the shaped block, selection information indicating a result of the selection (Step S113). For example, when a candidate block of type1 is selected, the selection information can be a bit indicating a value "0", and when a candidate block of type2 is selected, the selection information can be a bit indicating a value "1". Plural sequences of bit strings include an amplitude bit string and a non-amplitude bit string other than the amplitude bit string. The amplitude bit string indicates an amplitude of a one-dimensional modulation signal. It is desirable that the addition unit 124 adds selection information to the non-amplitude bit string.

Figure 8:
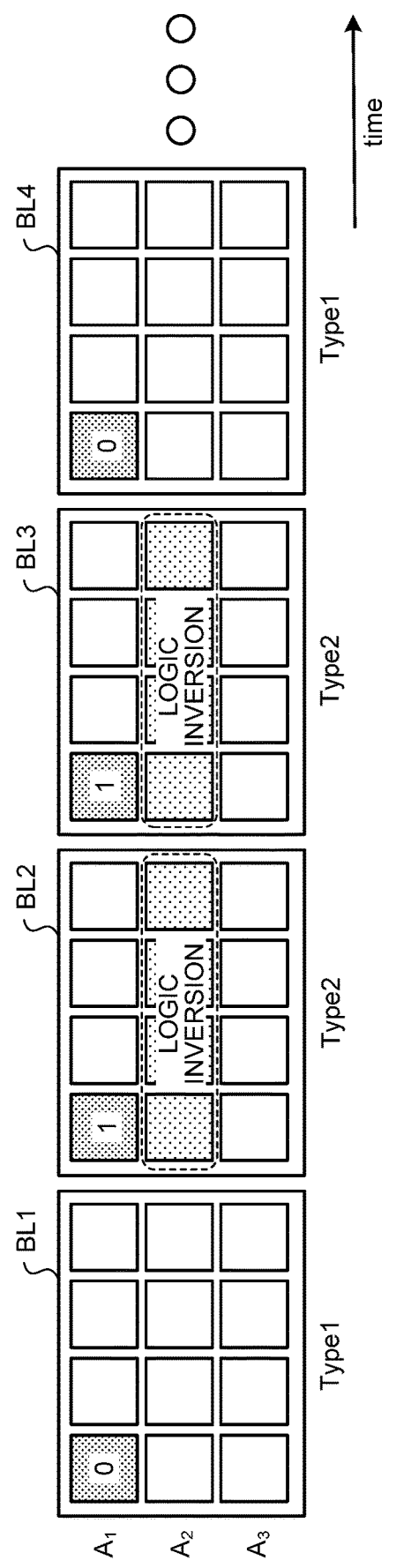
FIG. 8 is a diagram illustrating shaped blocks generated by the signal shaping device illustrated in FIG. 1.

FIG. 8 is a diagram illustrating shaped blocks generated by the signal shaping device 100 illustrated in FIG. 1. FIG. 8 illustrates an example in which a candidate block of type1 is selected as a first block BL1, a candidate block of type2 is selected as a second block BL2, a candidate block of type2 is selected as a third block BL3, and a candidate block of type1 is selected as a fourth block BL4. Selection information is added to a leading bit of the first sequence of the bit string $A_1$ of each block. The first sequence of the bit string $A_1$ is a bit that determines a PAM8 code, and is a non-amplitude bit string that does not affect the amplitude distribution as long as the mark ratio does not significantly deviate from ½.

Descriptions are focused again on FIG. 5. When the shaping process illustrated at Step S102 is ended, the symbol mapping unit 130 of the signal shaping device 100A performs a symbol mapping process to output a symbol sequence (Step S103). The transmission device 10 transmits, to the reception device 30, the symbol sequence generated by the signal shaping device 100A (Step S104).

When the shaping termination device 300A of the reception device 30 receives the symbol sequence, the likelihood generation unit 310 generates a likelihood by using the received symbol sequence and noise variance (Step S105). The likelihood generation unit 310 determines a log-likelihood ratio L_OH for selection information and a likelihood for each sequence. The likelihood generation unit 310 corrects the log-likelihood ratio L_OH for selection information to thereby obtain a corrected log-likelihood ratio L_OHN. Specifically, where c_N is defined as a normalization factor greater than 0, the likelihood generation unit 310 corrects the log-likelihood ratio L_OH to L_OHN=1 when L_OH>c_N, or corrects the log-likelihood ratio L_OH to L_OHN=−1 when L_OH<-c_N. In a case other than the above cases, the likelihood generation unit 310 corrects the log-likelihood ratio L_OH to L_OHN=L_OH/c_N. The noise variance may use a fixed value. Alternatively, other methods may be used such as searching an optimal value of the noise variance or spreading a known signal to be mixed with and transmitted with a shaped signal to use a detection result of the signal-to-noise ratio thereby to determine the noise variance.

The shaping termination unit 320 performs a shaping termination process on a received symbol before error correction decoding, such that the signal is restored to the pre-shaping state (Step S106). The shaping termination unit 320 performs a shaping termination process by using a likelihood generated by the likelihood generation unit 310. Specifically, since received symbols of the first sequence and the third sequence are not targeted for the shaping process, the shaping termination unit 320 does not perform a shaping termination process on the first sequence and the third sequence. On the basis of the received symbol of the second sequence and a likelihood L2S for the second sequence, the shaping termination unit 320 determines a log-likelihood ratio L2=L2S×L_OHN for the second sequence having undergone the shaping termination process.

The error-correction decoding unit 330 performs error correction decoding on an input signal (Step S107).

As described above, according to the first embodiment, the shaping process is performed on blocks obtained by dividing plural sequences of bit strings by a predetermined length. Specifically, a candidate block having at least one of the sequences of bit strings subjected to a complete inversion process, and a candidate block not having undergone the complete inversion process are generated, and a shaped block to be transmitted is selected from among these candidate blocks. This makes it possible to shape a signal with a simpler configuration and improve noise tolerance during transmission as compared to performing a shaping process on a two-dimensional modulation signal. Therefore, it is possible to increase data transmission speed.

In order to increase data transmission speed, various methods have been proposed such as increasing the baud rate and improving the modulation multilevel degree. A signal shaping technique is intended to eliminate the difference between the Shannon limit and the actual data transmission speed when the modulation multilevel degree is improved. This difference is caused by an influence of noise and other factors. Even if the influence of noise is reduced, this results in a noise reduction effect of $\pi e/6$ (1.53 dB) at a maximum. It is thus not reasonable to require excessively high processing complexity for such an insignificant improvement. The shaping efficiency and the processing complexity usually provide a trade-off therebetween, which poses a problem from the standpoint of the implementation. It is therefore important to improve noise tolerance with a simpler configuration that matches the noise reduction improvement effect.

Selection information indicating a result of the selection of a shaped block is assigned to a non-amplitude bit of the shaped block. This makes it possible to add the selection information to the shaped block and transmit this shaped block without affecting an amplitude of a signal to be transmitted.

Second Embodiment

The first embodiment has been explained as being applied to the normal concatenation that performs a signal shaping process on a signal after error correction coding and restores the shaped signal to the pre-shaping state before error correction decoding. A second embodiment of the present invention is explained as being applied to the reverse concatenation that performs a signal shaping process on a signal before error correction coding and restores the shaped signal to the pre-shaping state after error correction decoding. In the following descriptions, parts identical to those in the first embodiment are denoted by like reference signs and explanations thereof are omitted, and different parts between the second embodiment and the first embodiment are mainly described below.

Figure 9:
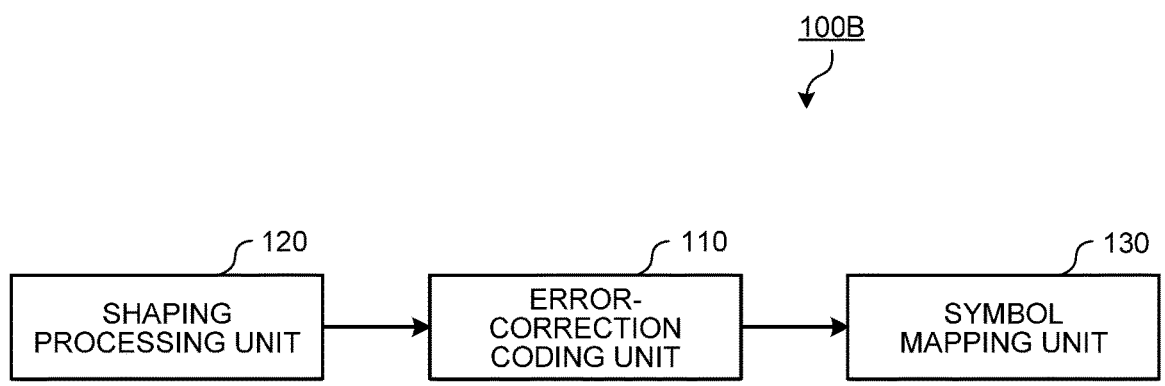
FIG. 9 is a diagram illustrating a configuration of a signal shaping device according to a second embodiment of the present invention.

FIG. 9 is a diagram illustrating a configuration of a signal shaping device 100B according to the second embodiment of the present invention. The signal shaping device 100B includes the shaping processing unit 120, the error-correction coding unit 110, and the symbol mapping unit 130. In the signal shaping device 100B, an output from the shaping processing unit 120 is input to the error-correction coding unit 110, and an output from the error-correction coding unit 110 is input to the symbol mapping unit 130. That is, the error-correction coding unit 110 performs error correction coding on a signal having undergone the shaping process, and the symbol mapping unit 130 performs a symbol mapping process on the signal having undergone the error correction coding.

Figure 10:
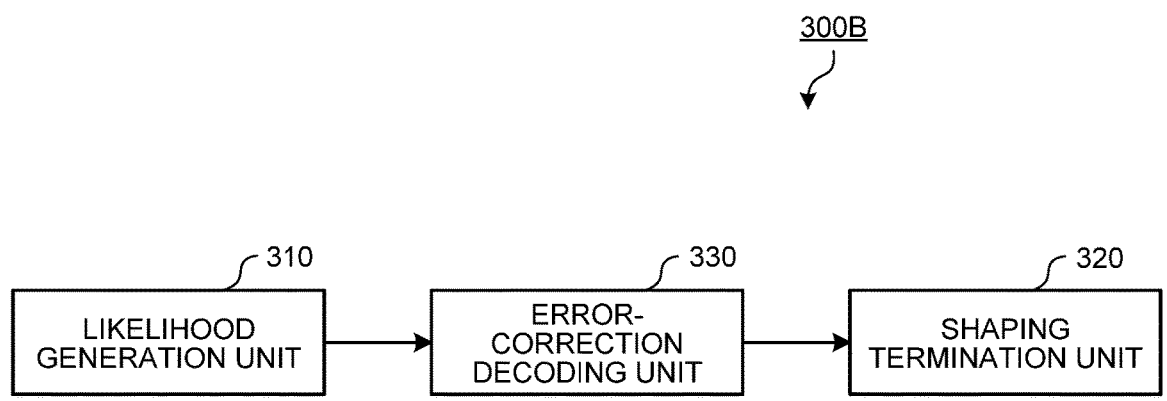
FIG. 10 is a diagram illustrating a configuration of a shaping termination device according to the second embodiment of the present invention.

FIG. 10 is a diagram illustrating a configuration of a shaping termination device 300B according to the second embodiment of the present invention. The shaping termination device 300B includes the likelihood generation unit 310, the error-correction decoding unit 330, and the shaping termination unit 320. In the shaping termination device 300B, an output signal from the likelihood generation unit 310 is input to the error-correction decoding unit 330, and an output signal from the error-correction decoding unit 330 is input to the shaping termination unit 320. That is, the error-correction decoding unit 330 performs error correction decoding on a post-likelihood-generation signal, and the shaping termination unit 320 performs a shaping termination process on the signal having undergone the error correction decoding.

Figure 11:
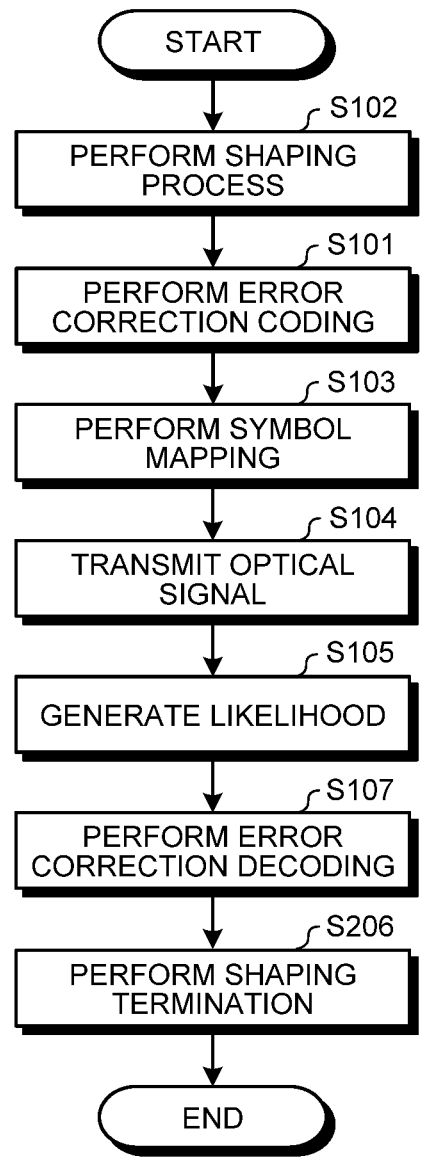
FIG. 11 is a flowchart illustrating an operation of a shaped-signal transmission system according to the second embodiment of the present invention.

FIG. 11 is a flowchart illustrating an operation of a shaped-signal transmission system according to the second embodiment of the present invention. The shaping processing unit 120 of the signal shaping device 100B performs a shaping process on an input signal (Step S102). After the shaping process is performed, the error-correction coding unit 110 performs error correction coding on the signal (Step S101). After the error correction coding is performed, the symbol mapping unit 130 performs a symbol mapping process (Step S103). Thereafter, the symbol sequence generated is transmitted to the shaping termination device 300B of the reception device 30 (Step S104). On the basis of the received symbol sequence, the likelihood generation unit 310 in the shaping termination device 300B generates a likelihood (Step S105). The error-correction decoding unit 330 performs error correction decoding on the signal with the likelihood generated (Step S107). Detailed descriptions of the processes described above are omitted because the shaped-signal transmission system operates in the same manner as in the first embodiment except that the processes are performed in a different order. In a case where the reverse concatenation as described above is performed, a signal to be input to the shaping termination unit 320 is a signal having undergone error correction decoding as explained above. Thus, when the selection information indicates the value 0, the shaping termination unit 320 does not perform any process on a corresponding shaped block, and when the selection information indicates the value 1, the shaping termination unit 320 performs logic inversion on the entire second sequence of a corresponding shaped block, thereby performing a shaping termination process of obtaining the pre-shaping bit string A (Step S206).

As explained above, according to the second embodiment of the present invention, the shaped-signal transmission system can shape and transmit a signal, and then restore the shaped signal to the pre-shaping state on the receiver side, in the case of not only the normal concatenation that performs a signal shaping process on a signal after error correction coding and restores the shaped signal to the pre-shaping state before error correction decoding, but also the reverse concatenation that performs a signal shaping process on a signal before error correction coding and restores the shaped signal to the pre-shaping state after error correction decoding.

Third Embodiment

The configuration of the shaped-signal transmission system 1 according to a third embodiment of the present invention is identical to the configuration of the first embodiment, and thus descriptions thereof are omitted. The third embodiment is different from the first embodiment in that in addition to selection information S, detection information P that is a parity bit intended for detecting an error in the selection information S is added to a shaped block.

Figure 12:
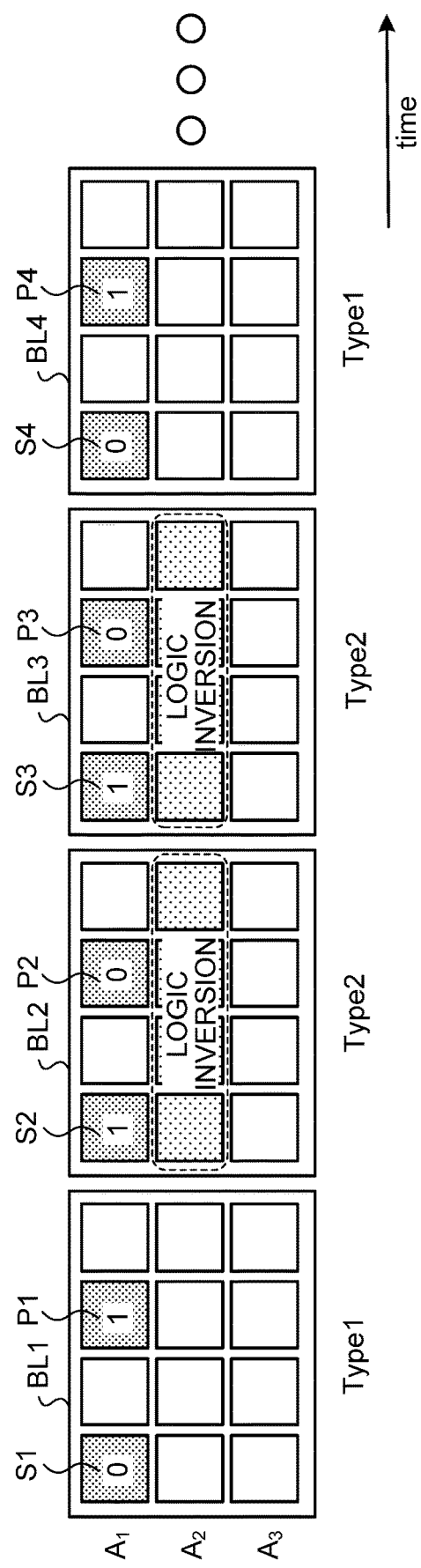
FIG. 12 is a diagram illustrating detection information to be added by a signal shaping device according to a third embodiment of the present invention.

FIG. 12 is a diagram illustrating the detection information P to be added by the signal shaping device 100 according to the third embodiment of the present invention. In an example illustrated in FIG. 12, a candidate block of type1 is selected as the first block BL1, a candidate block of type2 is selected as the second block BL2, a candidate block of type2 is selected as the third block BL3, and a candidate block of type1 is selected as the fourth block BL4. Accordingly, selection information S1 of the block BL1 indicates the value "0". Selection information S2 of the block BL2 indicates the value "1". Selection information S3 of the block BL3 indicates the value "1". Selection information S4 of the block BL4 indicates the value "0". FIG. 12 illustrates an example in which the selection information S having undergone logic inversion is used as the detection information P. In this case, detection information P1 of the block BL1 indicates the value "1". Detection information P2 of the block BL2 indicates the value "0". Detection information P3 of the block BL3 indicates the value "0". Detection information P4 of the block BL4 indicates the value "1".

When the detection information P is used, the likelihood generation unit 310 can use a combination of the log-likelihood ratio for the selection information S with the log-likelihood ratio for the detection information P. Where the log-likelihood ratio for the selection information S is represented as L_OH1 and the log-likelihood ratio for the detection information P is represented as L_OH2, then L_OH=L_OH1−L_OH2 can be defined.

It is desirable to use the method according to the third embodiment in performing the normal concatenation. It is desirable to use the above method when a length N of a single block is equal to or greater than 8. This is because when the length N is relatively short, redundant processing increases, but the influence of the selection information S is limited if the selection information S is incorrect.

Fourth Embodiment

The configuration of the shaped-signal transmission system 1 according to a fourth embodiment of the present invention is identical to the configuration of the second embodiment, and thus descriptions thereof are omitted. In the transmission device 10 according to the fourth embodiment, the signal shaping device 100B generates a candidate block by a method different from that in the second embodiment. Thus, different parts between the fourth embodiment and the second embodiment are mainly described below.

The generation unit 121 cyclically shifts an M-sequence to generate seven M-sequences, and then computes the exclusive-OR between the second sequence of the input bit string $A_2$ and the seven stages of M-sequences to generate seven candidate blocks. The generation unit 121 can also obtain eight candidate blocks including a candidate block having the second sequence of the bit string $A_2$ not subjected to the exclusive-OR with the M-sequence. The calculation unit 122 calculates, as a weight, the number of occurrences of logic 1 in the second sequence of the bit string $A_2$ included in the respective candidate blocks. The selection unit 123 selects a candidate block having the second sequence of the bit string $A_2$ whose calculated number of occurrences deviates furthest from 3.5 among the candidate blocks. The selected candidate block is a shaped block to be transmitted. Further, when the selected candidate block having the second sequence of the bit string $A_2$ whose number of occurrences of logic 1 is equal to or greater than four, then the selection unit 123 performs a logic inversion process on the entire second sequence of bit string in the candidate block whose number of occurrences of logic 1 is equal to or greater than four. The addition unit 124 generates three bits of selection information indicating a result of the selection made by the selection unit 123 from among the eight candidate blocks, and adds the generated selection information to the shaped block. The addition unit 124 generates one bit of selection information indicating whether the selection unit 123 has performed a logic inversion process on the second sequence of bit string, and adds the generated selection information to the shaped block. In this case, the selection information is made up of four bits in total. Decreasing the number of occurrences of logic 1 in the second sequence makes it possible to reduce the average power required for symbols included in a shaped block. The technique according to the fourth embodiment desirably applies where the reverse concatenation process is performed, because the method described above provides a larger number of bits of selection information per block, and, if the selection information is incorrect, an influence of such incorrect selection information is great.

The shaping termination unit 320 of the shaping termination device 300B first performs a shaping termination process on one bit of selection information indicating whether a logic inversion process has been performed in the same manner as the method explained with reference to FIG. 11 in the second embodiment. Subsequently, the shaping termination unit 320 performs exclusive-OR computation between three bits of selection information regarding the exclusive-OR computation and the corresponding M-sequence. In a case where a selected candidate block has not undergone the exclusive-OR computation, the shaping termination unit 320 does not perform the exclusive-OR computation.

Also in the shaped-signal transmission system 1 according to the fourth embodiment of the present invention described above, it is possible to shape a signal with a simpler configuration and improve noise tolerance during transmission as compared to performing a shaping process on a two-dimensional modulation signal.

In the fourth embodiment described above, the selection unit 123 may select a candidate block having the minimum number of occurrences of logic 1. In a case where the selection unit 123 selects a candidate block having the minimum number of occurrences of logic 1, the number of occurrences of logic 1 in the second sequence of bit string in the selected candidate block is normally equal to or smaller than three. Therefore, the complete inversion process is not necessarily performed.

Fifth Embodiment

The configuration of the shaped-signal transmission system 1 according to a fifth embodiment of the present invention is identical to the configuration of the second embodiment, and thus descriptions thereof are omitted. In the transmission device 10 according to the fifth embodiment, the signal shaping device 100B generates a candidate block by a method different from the second embodiment. Thus, different parts between the fifth embodiment and the second embodiment are mainly described below.

The generation unit 121 generates a quaternion symbol sequence having a length 8 and made up of the second sequence of the bit string $A_2$ and the third sequence of the bit string $A_3$. The generation unit 121 adds 0 to the trailing end of 15 stages of M-sequence to thereby obtain the M-sequence having a length 16, and divides the M-sequence into two sequences each having a length 8 to combine the sequences to form a quaternion sequence having a length 8 to generate a symbol scramble sequence that is a reference sequence. The generation unit 121 performs a bit scramble process to lead to a remainder of 4, on the sum of the reference sequence and the quaternion symbol sequence made up of the input bit strings $A_2$ and $A_3$. The generation unit 121 cyclically shifts the reference sequence to obtain at least eight patterns of reference sequences and performs the bit scramble process described above on the at least eight patterns of reference sequences. The results of the bit scramble process provide candidate blocks. The selection unit 123 selects, from among the eight patterns of candidate blocks, a candidate block having a minimum weight. The selected candidate block is a shaped block to be transmitted.

The addition unit 124 adds, to the shaped block, three bits of selection information that is a result of the selection made by the selection unit 123.

Sixth Embodiment

The configuration of the shaped-signal transmission system 1 according to a sixth embodiment of the present invention is identical to the configuration of the first embodiment or the second embodiment, and thus descriptions thereof are omitted. In the transmission device 10 according to the sixth embodiment, the generation unit 121 in the signal shaping device 100 generates a candidate block by a method different from the first and second embodiments.

When the length N of a single block is equal to 15, the generation unit 121 generates one pattern of sequence in which the elements are all 0, and 15 patterns of sequences in which one of the elements is 1 and the other elements are all 0 in the sequences with the length 15, and replaces the generated sequence with the second sequence of the bit string $A_2$ to obtain a candidate block. The 16 patterns of sequences are assigned four bits, and thus there are four input bits to be assigned to any of the 16 patterns of sequences. For example, in a case where 0 is input when represented in hexadecimal form, the all-zero sequence can be assigned, and in a case where any of 1 to 15 is input when represented in hexadecimal form, the input can correspond to the position of logic 1 in each individual single sequence. This makes it possible to reduce the number of occurrences of logic 1 in the second sequence, decrease the average power required for symbols included in a shaped block, and improve noise tolerance during transmission.

Seventh Embodiment

The signal shaping device 100 can not only use any one of the shaping methods explained in the first to sixth embodiments described above, but can also use a combination of some of these shaping methods. In the first to sixth embodiments described above, a predetermined process is performed on the second sequence of the bit string $A_2$ to generate a candidate block. Alternatively, a predetermined process may be performed on the third sequence of the bit string $A_3$. In this case, the absolute value of an amplitude of a signal to be transmitted has a higher probability of becoming relatively small. This makes it possible to further improve the noise tolerance during transmission.

Eighth Embodiment

In the first to seventh embodiments described above, a signal to be transmitted through the transmission path 20 may be an electric signal, and the type of signal need not be a particular type of signal. However, in an eighth embodiment of the present invention, an example is explained in which the technique of the present invention is applied to an optical transmission system that converts a shaped electric signal to an optical signal and transmits the optical signal.

Figure 13:
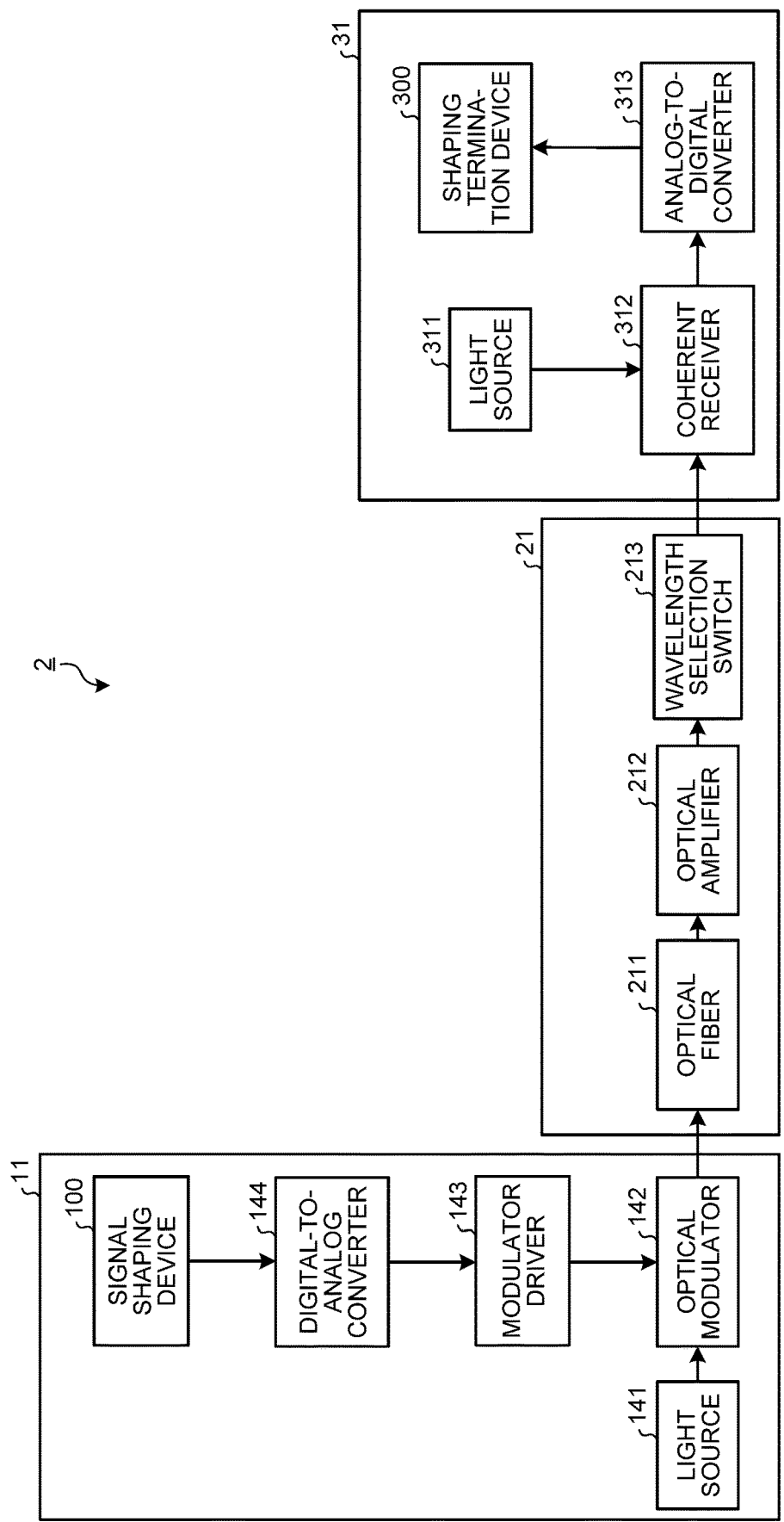
FIG. 13 is a diagram illustrating a configuration of a shaped-signal transmission system according to an eighth embodiment of the present invention.

FIG. 13 is a diagram illustrating a configuration of a shaped-signal transmission system 2 according to the eighth embodiment of the present invention. The shaped-signal transmission system 2 is an optical-signal transmission system, and includes a light transmission device 11, an optical transmission path 21, and a light reception device 31.

The light transmission device 11 includes the signal shaping device 100, a light source 141, an optical modulator 142, a modulator driver 143, and a digital-to-analog converter 144. The signal shaping device 100 is the signal shaping device 100A. The signal shaping device 100A, which is one of the signal shaping devices 100 according to the first to seventh embodiments described above, performs the normal concatenation. The light source 141 emits light to be used to generate an optical signal. The optical modulator 142 modulates the light emitted from the light source 141, to generate an optical signal. The optical modulator 142 outputs the generated optical signal to the optical transmission path 21. The modulator driver 143 drives the optical modulator 142 on the basis of a one-dimensional modulation signal that is an electric signal generated by the signal shaping device 100. The digital-to-analog converter 144 converts a digital electric signal generated by the signal shaping device 100 into an analog electric signal, and inputs the analog electric signal to the modulator driver 143. Due to the configuration described above, the light transmission device 11 can generate an optical signal from an electric signal generated by the signal shaping device 100, and outputs the optical signal to the optical transmission path 21.

The optical transmission path 21 is a transmission path that interconnects the light transmission device 11 and the light reception device 31 to transmit an optical signal. The optical transmission path 21 includes an optical fiber 211, an optical amplifier 212, and a wavelength selection switch 213. An optical signal output by the light transmission device 11 is transmitted through the optical transmission path 21 to the light reception device 31.

The light reception device 31 includes a light source 311, a coherent receiver 312, an analog-to-digital converter 313, and the shaping termination device 300. The light source 311 emits locally-oscillated light having its center frequency corresponding with that of modulated light received. The coherent receiver 312 causes the locally-oscillated light emitted from the light source 311 to interfere with the modulated light received from the optical transmission path 21, and converts the light to an electric signal. The analog-to-digital converter 313 converts the electric signal received from the coherent receiver 312 to a digital signal, and inputs the digital signal to the shaping termination device 300. The shaping termination device 300 is the shaping termination device 300A. The shaping termination device 300A, which is one of the shaping termination devices 300 according to the first to seventh embodiments described above, performs the normal concatenation.

Figure 14:
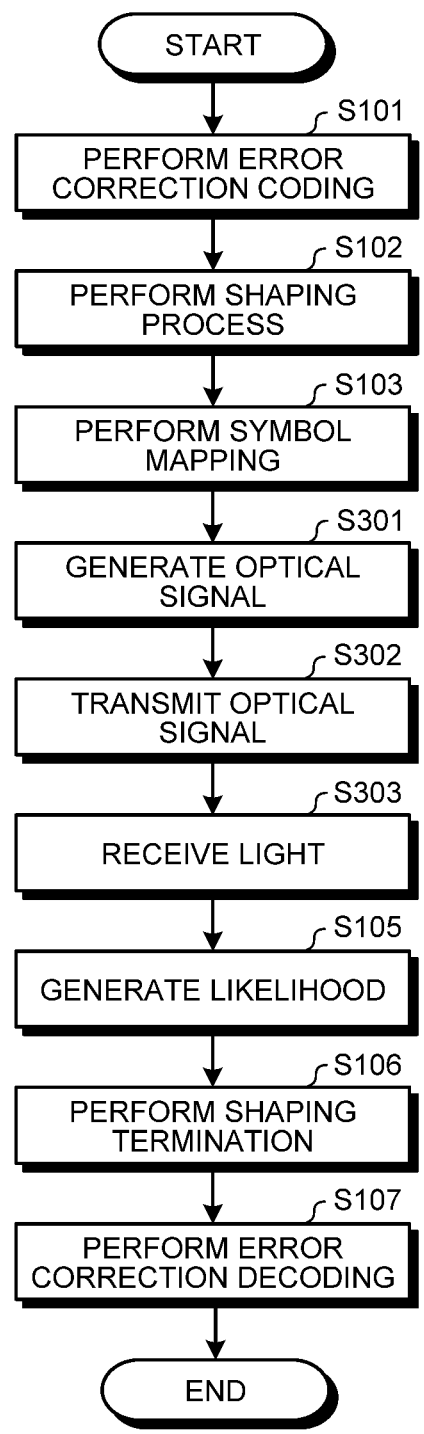
FIG. 14 is a flowchart illustrating an operation of the shaped-signal transmission system illustrated in FIG. 13.

FIG. 14 is a flowchart illustrating an operation of the shaped-signal transmission system 2 illustrated in FIG. 13. First, the error-correction coding unit 110 of the light transmission device 11 performs an error correction coding process and outputs a signal having undergone the error correction coding process (Step S101). The shaping processing unit 120 then performs a shaping process on the signal output by the error-correction coding unit 110 and outputs the signal having undergone the shaping process (Step S102). The symbol mapping unit 130 performs a symbol mapping process on the signal output by the shaping processing unit 120 and outputs an electric signal that is a one-dimensional modulation signal (Step S103).

The electric signal output from the symbol mapping unit 130 is converted into an analog electric signal by the digital-to-analog converter 144, and thereafter input to the modulator driver 143. On the basis of the input electric signal, the modulator driver 143 drives the optical modulator 142 so that the optical modulator 142 modulates light emitted from the light source 141 to generate an optical signal (Step S301). Then, an optical signal is output from the light transmission device 11.

The optical signal output from the light transmission device 11 is transmitted through the optical transmission path 21 (Step S302). The coherent receiver 312 of the light reception device 31 uses the light emitted from the light source 311 to perform a light receiving process of causing the received optical signal to interfere with the light emitted from the light source 311, performing coherent detection, converting the optical signal to an electric signal, and outputting the electric signal (Step S303). The analog electric signal generated by the coherent receiver 312 is converted into a digital signal by the analog-to-digital converter 313 and input to the shaping termination device 300.

The likelihood generation unit 310 of the shaping termination device 300 performs a likelihood generation process and outputs a signal having undergone the likelihood generation process (Step S105). The shaping termination unit 320 performs a shaping termination process on the signal output by the likelihood generation unit 310 and outputs the signal having undergone the shaping termination process (Step S106). The error-correction decoding unit 330 performs error correction decoding on the signal output by the shaping termination unit 320 (Step S107).

In the explanations of FIG. 14, operations identical to those in FIG. 5 are denoted by like reference signs and detailed descriptions thereof are omitted. Further, although descriptions of the points not directly relevant to the characteristics of the present invention are omitted, the light transmission device 11 may perform, for example, signal processing such as signal spectrum shaping, amplitude adjustment, skew adjustment, and electric signal amplification. The optical transmission path 21 may perform signal processing such as wavelength division multiplexing, optical amplification, and route selection. The light reception device 31 may perform signal processing such as waveform distortion compensation, adaptive cross-polarization separation, clock recovery, and carrier recovery.

Figure 15:
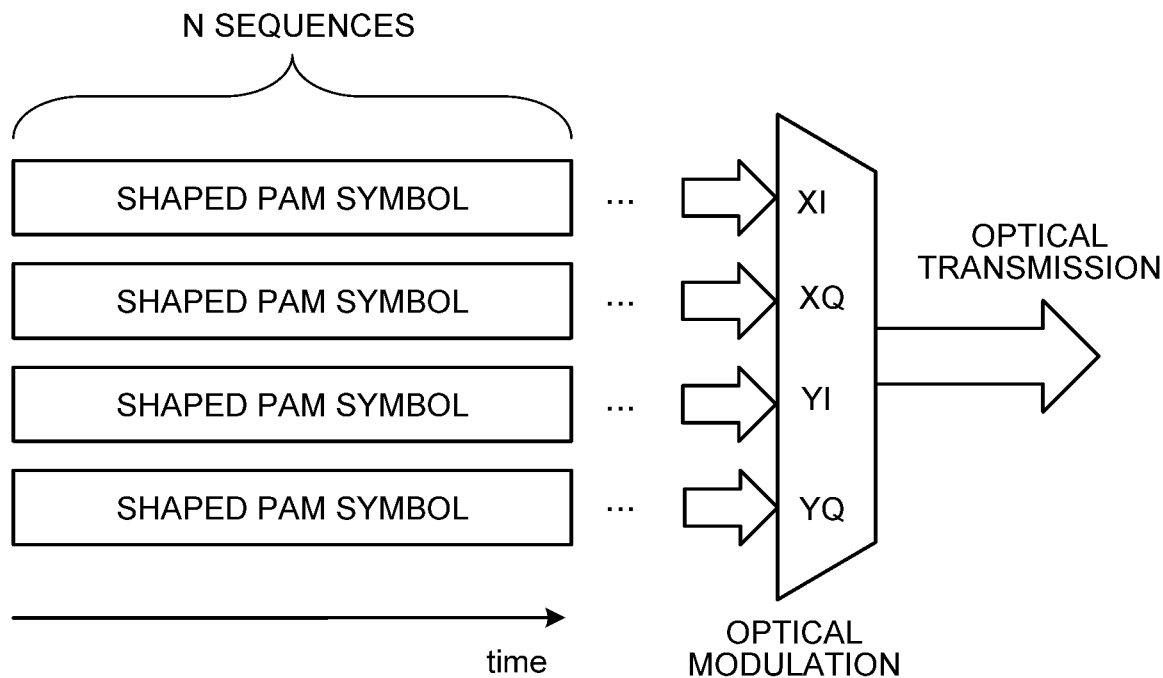
FIG. 15 is a diagram illustrating a first example of a method for converting a one-dimensional modulation signal into a polarization-multiplexed IQ signal.
Figure 16:
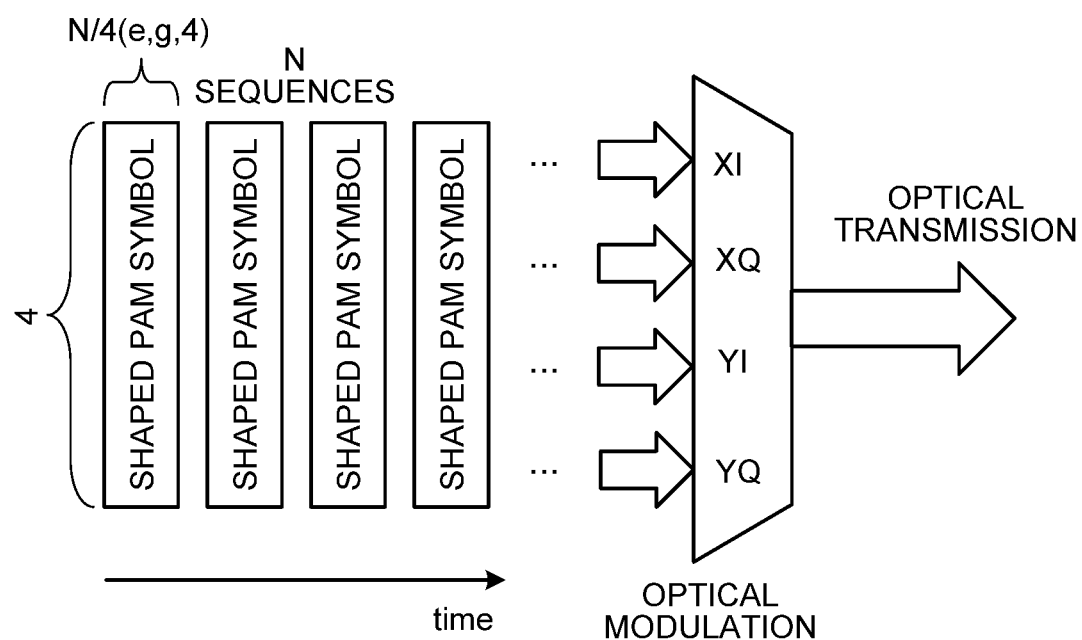
FIG. 16 is a diagram illustrating a second example of the method for converting a one-dimensional modulation signal into a polarization-multiplexed IQ signal.

There are various possible methods for converting a shaped one-dimensional modulation signal into a polarization-multiplexed IQ signal. FIG. 15 is a diagram illustrating a first example of the method for converting a one-dimensional modulation signal into a polarization-multiplexed IQ signal. In the example illustrated in FIG. 15, four shaped PAM symbols are assigned to a horizontal polarization I-axis (XI), a horizontal polarization Q-axis (XQ), a vertical polarization I-axis (YI), and a vertical polarization Q-axis (YQ), respectively. FIG. 16 is a diagram illustrating a second example of the method for converting a one-dimensional modulation signal into a polarization-multiplexed IQ signal. In the example illustrated in FIG. 16, a single shaped PAM symbol is assigned across the horizontal polarization I-axis, the horizontal polarization Q-axis, the vertical polarization I-axis, and the vertical polarization Q-axis. The method for converting a one-dimensional modulation signal into a polarization-multiplexed IQ signal is not limited to the examples illustrated in FIGS. 15 and 16. For example, a shaped PAM symbol may be assigned only across the I/Q-axes rather than across polarizations. Also, a shaped PAM symbol may be arranged in distribution in the direction of time. It is desirable that selection information is assigned uniformly to the horizontal polarization I-axis, the horizontal polarization Q-axis, the vertical polarization I-axis, and the vertical polarization Q-axis, without being assigned only on any one of the axes. Application of the technique of the present invention to an optical transmission system makes it possible to reduce the influence of nonlinear optical effect generated during transmission.

Ninth Embodiment

Figure 17:
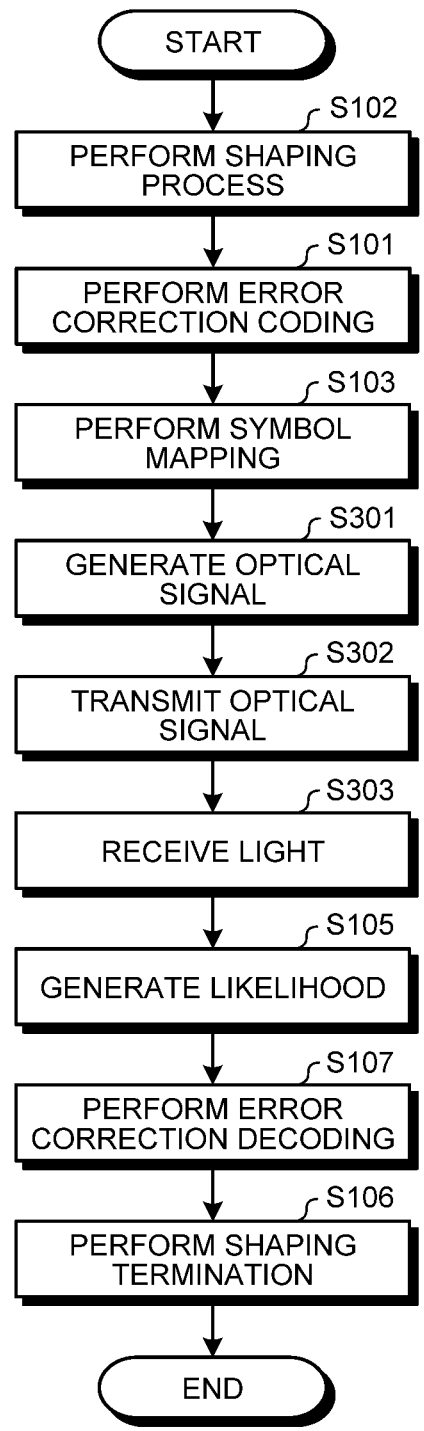
FIG. 17 is a flowchart illustrating an operation of a shaped-signal transmission system according to a ninth embodiment of the present invention.

FIG. 17 is a flowchart illustrating an operation of the shaped-signal transmission system 2 according to a ninth embodiment of the present invention. The configuration of the shaped-signal transmission system 2 according to the ninth embodiment of the present invention is identical to the configuration of the eighth embodiment, and is different from the eighth embodiment in that the signal shaping device 100 is the signal shaping device 100B that performs the reverse concatenation, and the shaping termination device 300 is the shaping termination device 300B that performs the reverse concatenation.

The shaping processing unit 120 of the signal shaping device 100B performs a shaping process and outputs a signal having undergone the shaping process (Step S102). The error-correction coding unit 110 performs error correction coding on the signal output by the shaping processing unit 120 and outputs the processed signal (Step S101). The symbol mapping unit 130 performs a symbol mapping process on the signal output by the error-correction coding unit 110 and outputs the signal having undergone the symbol mapping process (Step S103).

The light source 141 and the optical modulator 142 perform an optical signal generation process and output an optical signal generated by the optical signal generation process (Step S301). The optical transmission path 21 transmits the output optical signal to the light reception device 31 (Step S302). The light source 311, the coherent receiver 312, and the analog-to-digital converter 313 in the light reception device 31 perform a light receiving process, and then input, to the shaping termination device 300B, a signal having undergone the light receiving process (Step S303).

The likelihood generation unit 310 of the shaping termination device 300B performs a likelihood generation process and outputs a signal having undergone the likelihood generation process (Step S105). The error-correction decoding unit 330 performs error correction decoding on the signal output by the likelihood generation unit 310 and outputs the processed signal (Step S107). The shaping termination unit 320 performs a shaping termination process on the signal output by the error-correction decoding unit 330 (Step S106).

Since the respective operations illustrated in FIG. 17 have been already explained in the first to eighth embodiments described above, detailed explanations thereof are omitted. As described above, in the optical signal transmission system, it is also possible to configure the shaped-signal transmission system 2 that performs the reverse concatenation.

Figure 18:
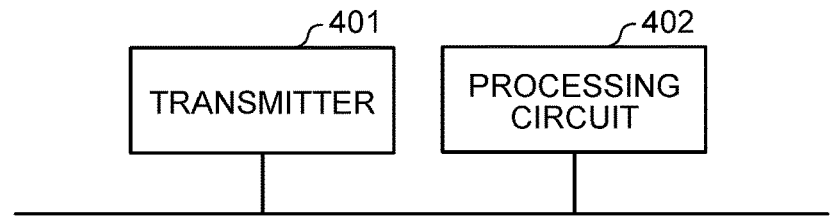
FIG. 18 is a diagram illustrating a hardware configuration to implement a transmission device illustrated in FIG. 1 and a light transmission device illustrated in FIG. 13.
Figure 19:
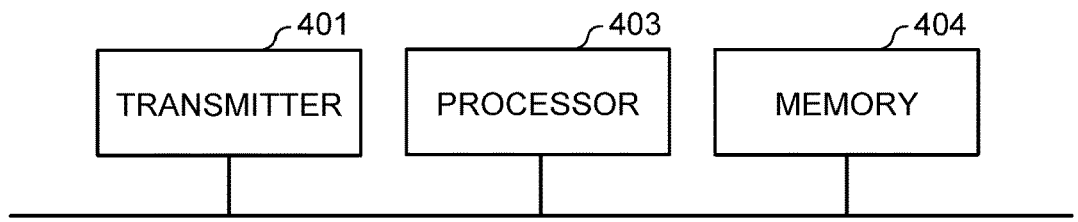
FIG. 19 is a diagram illustrating a hardware configuration to implement the transmission device illustrated in FIG. 1 and the light transmission device illustrated in FIG. 13.

FIGS. 18 and 19 are diagrams illustrating a hardware configuration to implement the transmission device 10 illustrated in FIG. 1 and the light transmission device 11 illustrated in FIG. 13. The functions of the transmission device 10 illustrated in FIG. 1 can be implemented by a transmitter 401 and a processing circuit 402. The transmission processing function of the transmission device 10 can be implemented by the transmitter 401. The function of the signal shaping device 100 of the transmission device 10 can be implemented by the processing circuit 402. That is, the transmission device 10 includes a processing circuit that performs error correction coding, a shaping process, and a symbol mapping process, on a signal to be transmitted. The processing circuit 402 may be either dedicated hardware or a memory 404 and a processor 403 that executes computer programs stored in the memory 404. The processor 403 may be, for example, a CPU (Central Processing Unit), a central processor, a processing device, a calculation device, a microprocessor, a microcomputer, or a DSP (Digital Signal Processor).

When the processing circuit 402 is dedicated hardware, the processing circuit 402 corresponds to, for example, a single circuit, a composite circuit, a programmed processor, a parallel programmed processor, an ASIC (Application Specific Integrated Circuit), an FPGA (Field Programmable Gate Array), or a combination of these elements. Each of the functions of the error-correction coding unit 110, the shaping processing unit 120, and the symbol mapping unit 130, of the signal shaping device 100 can be implemented by the processing circuit 402, or all of these functions can be implemented together by the processing circuit 402.

When the processing circuit 402 is the processor 403 and the memory 404, the functions of the error-correction coding unit 110, the shaping processing unit 120, and the symbol mapping unit 130 in the signal shaping device 100 are implemented by software, firmware, or a combination of the software and the firmware. The software or firmware is described as a program and stored in the memory 404. In the processing circuit 402, the processor 403 reads and executes the programs stored in the memory 404, thereby implementing the function of each of the units. That is, when the transmission device 10 is implemented by the processing circuit 402, the transmission device 10 includes the memory 404 that stores therein computer programs for performing error correction coding, a shaping process, and a symbol mapping process, on a signal to be transmitted. Further, these programs can be regarded as programs for causing a computer to execute procedures and methods performed by the signal shaping device 100.

The memory 404 is, for example, a nonvolatile or volatile semiconductor memory such as a ROM (Read Only Memory), a RAM (Random Access Memory), a flash memory, an EPROM (Erasable Programmable ROM), and an EEPROM (Electrically Erasable Programmable ROM), a magnetic disk, a flexible disk, an optical disk, a compact disk, a mini disk, and a DVD (Digital Versatile Disc).

Some of the functions of the error-correction coding unit 110, the shaping processing unit 120, and the symbol mapping unit 130 of the signal shaping device 100 may be implemented by dedicated hardware and some of these functions may be implemented by software or firmware.

As described above, the processing circuit 402 can implement the above described functions by hardware, software, firmware, or a combination thereof.

The light transmission device 11 illustrated in FIG. 13 can be implemented by the transmitter 401 and the processing circuit 402. The light source 141, the optical modulator 142, and the modulator driver 143 in the light transmission device 11 are the transmitter 401. In this case, the transmitter 401 is a light transmitter that outputs an optical signal. Since the signal shaping device 100 in the light transmission device 11 is identical to that included in the transmission device 10 described above, explanations thereof are omitted.

Figure 20:
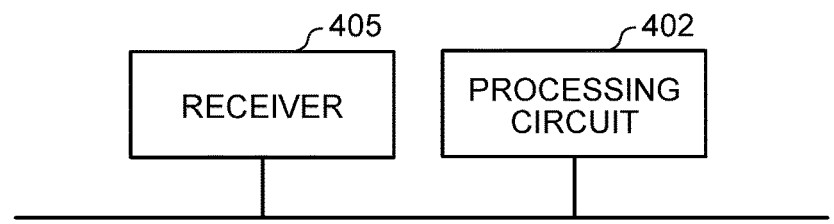
FIG. 20 is a diagram illustrating a hardware configuration to implement a reception device illustrated in FIG. 1 and a light reception device illustrated in FIG. 13.
Figure 21:
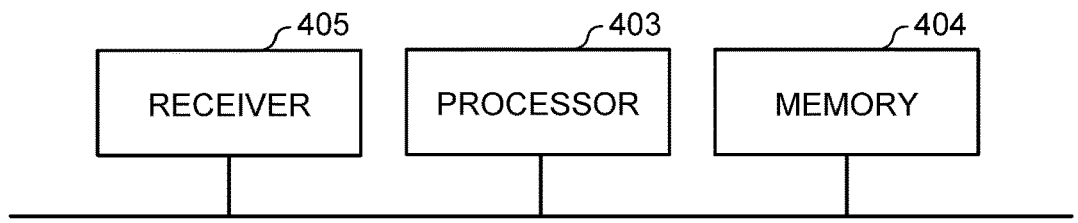
FIG. 21 is a diagram illustrating a hardware configuration to implement the reception device illustrated in FIG. 1 and the light reception device illustrated in FIG. 13.

FIGS. 20 and 21 are diagrams illustrating a hardware configuration to implement the reception device 30 illustrated in FIG. 1 and the light reception device 31 illustrated in FIG. 13. The reception device 30 illustrated in FIG. 1 can be implemented by a receiver 405 and the processing circuit 402. The light reception device 31 illustrated in FIG. 13 can be implemented by the receiver 405 and the processing circuit 402. The light source 311, the coherent receiver 312, and the analog-to-digital converter 313 are the receiver 405. In this case, the receiver 405 is a light receiver that receives an optical signal.

The signal shaping device 100 and the shaping termination device 300 can be one of internal functions of an integrated circuit.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 1, 2 shaped-signal transmission system, 10 transmission device, 11 light transmission device, 20 transmission path, 21 optical transmission path, 30 reception device, 31 light reception device, 100, 100A, 100B signal shaping device, 110 error-correction coding unit, 120 shaping processing unit, 121 generation unit, 122 calculation unit, 123 selection unit, 124 addition unit, 130 symbol mapping unit, 141, 311 light source, 142 optical modulator, 143 modulator driver, 144 digital-to-analog converter, 211 optical fiber, 212 optical amplifier, 213 wavelength selection switch, 300, 300A, 300B shaping termination device, 310 likelihood generation unit, 312 coherent receiver, 313 analog-to-digital converter, 320 shaping termination unit, 330 error-correction decoding unit, 401 transmitter, 402 processing circuit, 403 processor, 404 memory, 405 receiver, BL1, BL2, BL3, BL4 block, S1, S2, S3, S4 selection information, P1, P2, P3, P4 detection information.

The invention claimed is:

1. A signal shaping device comprising:
generation circuitry to perform plural types of predetermined processes on blocks obtained by dividing plural sequences of bit strings by a predetermined length, and generate a plurality of candidate blocks that are candidates for a shaped block to be transmitted;
calculation circuitry to calculate, on a candidate-block-by-candidate-block basis, a weight of a one-dimensional modulation symbol when a plurality of bits included in the candidate block are converted into the one-dimensional modulation symbol;
selection circuitry to select the shaped block from among the candidate blocks on a basis of the weight;
addition circuitry to add, to the shaped block, selection information indicating a selection result; and
symbol mapping circuitry to generate a one-dimensional modulation signal by converting a plurality of bits included in the shaped block, into the one-dimensional modulation symbol.

2. The signal shaping device according to claim 1, wherein the generation circuitry performs a complete inversion process on at least one sequence of bit string as the predetermined process to generate the candidate blocks, the generated candidate blocks being a block having undergone the complete inversion process and a block not undergoing the complete inversion process.

3. The signal shaping device according to claim 1, wherein the generation circuitry performs a bit scramble process on at least one sequence of bit string as the predetermined process to generate the candidate blocks.

4. The signal shaping device according to claim 3, wherein the generation circuitry uses a plurality of reference sequences to perform the bit scramble process on one sequence of bit string among the sequences of bit strings, the reference sequences being generated by cyclically shifting an M-sequence.

5. The signal shaping device according to claim 3, wherein the generation circuitry performs the bit scramble process on two or more sequences of bit strings among the sequences of bit strings.

6. The signal shaping device according to claim 5, wherein the generation circuitry performs the bit scramble process by using a plurality of reference sequences generated by combining sequences obtained by cyclically shifting a plurality of M-sequences.

7. The signal shaping device according to claim 1, wherein the weight is any one of a power of the symbol, a square root of the power, a square of the power, and the number of occurrences of logic 1 in a predetermined sequence of bit string among the sequences of bit string.

8. The signal shaping device according to claim 1, wherein the weight is a distance from any reference value to any one of a power of the symbol, a square root of the power, a square of the power, and the number of occurrences of logic 1 in a predetermined sequence of bit string among the sequences of bit strings.

9. The signal shaping device according to claim 1, wherein in addition to the selection information, the addition circuitry further adds, to the shaped block, detection information for detecting an error in the selection information.

10. The signal shaping device according to claim 9, wherein the detection information is a bit obtained by performing logic inversion on the selection information.

11. A shaping termination device to perform a shaping termination process of restoring the shaped block shaped by the signal shaping device according to claim 9, to a pre-shaping state, wherein
the shaping termination device combines likelihoods for the selection information and the detection information that are included in the shaped block to recover the selection result, and uses the recovered selection result to restore the shaped block to a pre-shaping state.

12. The signal shaping device according to claim 1, wherein
the sequences of bit strings include:
an amplitude bit string indicating an amplitude of the one-dimensional modulation signal; and
a non-amplitude bit string other than the amplitude bit string, and
the addition circuitry adds the selection information to the non-amplitude bit string.

13. The signal shaping device according to claim 1, wherein the selection circuitry selects the candidate block having a minimum value of the weight, and when there are a plurality of the candidate blocks having a minimum value of the weight, the selection circuitry selects, from among the candidate blocks having the minimum value of the weight, the candidate block on a basis of disproportionate selection results.

14. The signal shaping device according to claim 1, wherein the generation circuitry generates the candidate block by converting at least one sequence of bit string into a bit string in which all elements are logic 0, or into a bit string in which one of elements is logic 1 and the other elements are logic 0.

15. The signal shaping device according to claim 1, wherein the generation circuitry performs plural types of the predetermined processes in order to generate the single candidate block.

16. A shaping termination device to perform a shaping termination process of restoring the shaped block provided by the signal shaping device according to claim 1, to a pre-shaping, the shaping termination device comprising
shaping termination circuitry to restore the shaped block to a pre-shaping state on a basis of the selection information included in the shaped block.

17. The shaping termination device according to claim 16, further comprising a likelihood generation circuitry to generate a likelihood for the shaped block received, wherein
when a likelihood for the selection result is lower than a predetermined value, a likelihood for a block generated by restoring the shaped block to a pre-shaping state is decreased.

18. The shaping termination device according to claim 17, wherein the likelihood generation circuitry generates a likelihood for the shaped block by using a received noise variance of an intermittently known signal mixed with the shaped block being transmitted.

19. A signal shaping method comprising:
performing plural types of predetermined processes on blocks obtained by dividing plural sequences of bit strings by a predetermined length, and generating a plurality of candidate blocks that are candidates for a shaped block to be transmitted;
calculating, on a candidate-block-by-candidate-block basis, a weight of a one-dimensional modulation symbol when a plurality of bits included in the candidate block are converted into the one-dimensional modulation symbol;
selecting, from among the candidate blocks, the shaped block on a basis of the weight;
adding, to the shaped block, selection information indicating a selection result; and
generating a one-dimensional modulation signal by converting a plurality of bits included in the shaped block, into the one-dimensional modulation symbol.

20. An optical transmission method including the signal shaping method according to claim 19, the optical transmission method comprising:
performing error correction coding on an electric signal;
generating the candidate blocks by using the electric signal having undergone the error correction coding;
selecting the shaped block;
adding the selection information;
generating the one-dimensional modulation signal;
converting the one-dimensional modulation signal into an optical signal;
transmitting a generated optical signal;
converting the transmitted optical signal into an electric signal;
determining a likelihood for an electric signal;
performing a shaping termination process on a post-likelihood-generation signal; and
performing error correction decoding on a signal having undergone the shaping termination process.

* * * * *